United States Patent [19]

Massey et al.

[11] 4,455,477

[45] Jun. 19, 1984

[54] ELECTRIC BOILING WATER HEATER

[75] Inventors: Raymond D. Massey, Cambridge Park; Leonard Newsam, Dulwich Hill, both of Australia

[73] Assignee: Zip Heaters (Aust) Pty. Limited, Marrickville, Australia

[21] Appl. No.: 400,174

[22] Filed: Jul. 20, 1982

Related U.S. Application Data

[63] Continuation-in-part of Ser. No. 140,927, Apr. 16, 1980, abandoned.

[51] Int. Cl.[3] .......................... H05B 1/02; F24H 1/20; A47J 27/21

[52] U.S. Cl. ...................................... 219/328; 99/281; 137/341; 219/306; 219/308; 219/312; 219/333; 222/146 HE

[58] Field of Search ................................ 219/306-310, 219/312, 314, 316, 320-324, 327, 328, 330, 331, 333; 222/146 HE; 99/279-282; 122/13 A; 137/341

[56] References Cited

U.S. PATENT DOCUMENTS

| | | | |
|---|---|---|---|
| 2,894,109 | 7/1959 | Kendon | 219/312 X |
| 3,497,673 | 2/1970 | Wright | 219/328 |

FOREIGN PATENT DOCUMENTS

| | | | |
|---|---|---|---|
| 72286 | 8/1976 | Australia | 219/333 |
| 451309 | 8/1936 | United Kingdom | 219/328 |
| 939355 | 10/1963 | United Kingdom | 219/312 |
| 1372698 | 11/1974 | United Kingdom | 219/328 |

*Primary Examiner*—A. Bartis

*Attorney, Agent, or Firm*—Ladas & Parry

[57] ABSTRACT

A boiling water heater incorporating a tank with electrical heating element and water level control wherein the supply of current to the element is controlled by the temperature in an inclined condenser tube extending upwardly from the top of the tank. The condenser tube incorporates a steam exhaust flue, a temperature sensing bulb and a cold water inlet. The temperature sensing bulb is located with its lower end adjacent the cold water inlet into the condenser tube but below the steam exhaust flue outlet from that tube. The thermostat controls the operation of the heating element and the water level control valve so that the element is disconnected from the electricity supply and the control valve opened in response to the temperature in the condenser tube being above a predetermined lower limit when the water level in the tank as sensed by the water level control is above a predetermined lower limit.

8 Claims, 3 Drawing Figures

ELECTRIC BOILING WATER HEATER

This application is a continuation-in-part application to application Ser. No. 140,927 filed at the U.S. Patent and Trademark Office on Apr. 16, 1980 now abandoned.

This invention relates to a boiling water heater and has been devised particularly but not solely for continuous supply of boiling water.

Water heaters of the type to which this invention relates have in the past not been entirely satisfactory in that when substantial quantities of water are removed from the vessel or the vessel is freshly filled from the empty condition, there is a substantial time lapse before hot or boiling water is available for use. An attempt has been made to provide a water heater which will provide continuous boiling water by using a temperature sensing control incorporated in a condenser on top of the heating tank but these systems have the disadvantage that the condenser is large, bulky and unsightly.

It is therefore an object of the present invention to provide a boiling water heater which will obviate or minimise the foregoing disadvantages in a simple yet effective manner or which will at least provide the public with a useful choice.

Accordingly the invention consists in a boiling water heater comprising a tank, a heating element within said tank, an outlet located near the bottom of said tank, an inclined condenser tube extending upwardly from a point at or near the top of the tank, a water supply pipe communicating with the interior of said condenser tube at a water inlet point intermediate the length thereof, a control valve in said water supply pipe, level control means actuable by the water level in said tank and arranged to operate said control valve to maintain the water level in said tank within predetermined limits, a substantially vertical flue extending upwardly from and communicating with the interior of said inclined condenser tube at a location above said water inlet point and temperature sensing means located within said inclined condenser tube and operable to control said heating element and the inflow of water through said water supply pipe in accordance with the temperature of steam in said condenser tube.

Notwithstanding any other forms that may fall within its scope one preferred form of the invention will now be described by way of example only with reference to the accompanying drawings in which.

In the preferred form of the invention in a boiling water heater is constructed as follows:

A tank 1 is provided which may for example be a rectangular metal tank which is provided with a heating element 2 and preferably an electric heating element having terminals 3. The heating element is located near the bottom of the tank. A hot water draw-off or outlet 4 is provided located slightly above the level of the heating element so that in use it is impossible to completely empty the tank and leave the heating element uncovered by water. The outlet may be coupled directly to a draw-off valve or tap or connected to a piping system.

Figure 1:
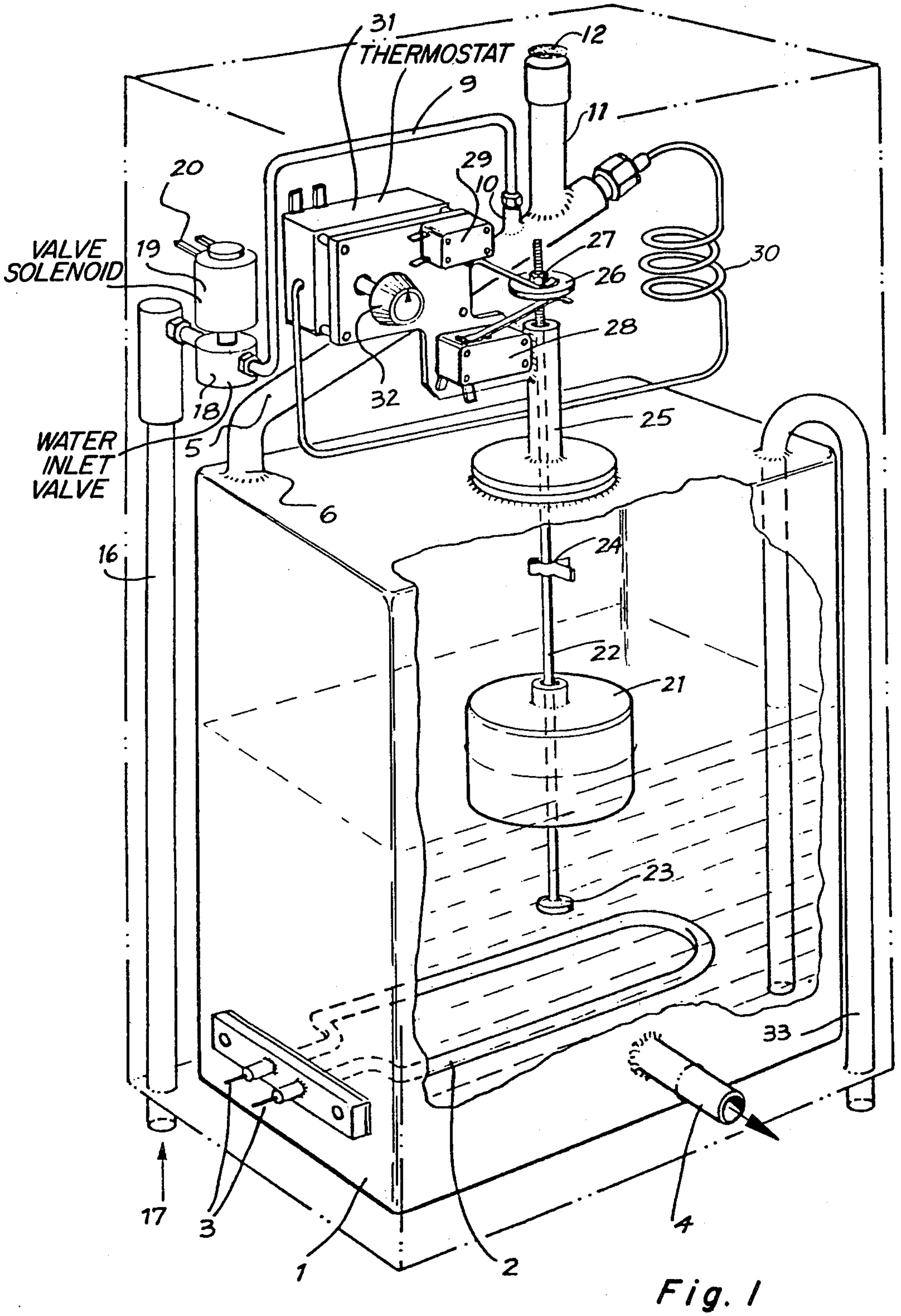
FIG. 1 is a perspective view of a boiling water heater according to the invention having the casing thereof shown in broken outline and the tank thereof cut away to provide a view of the interior components.
Figure 2:
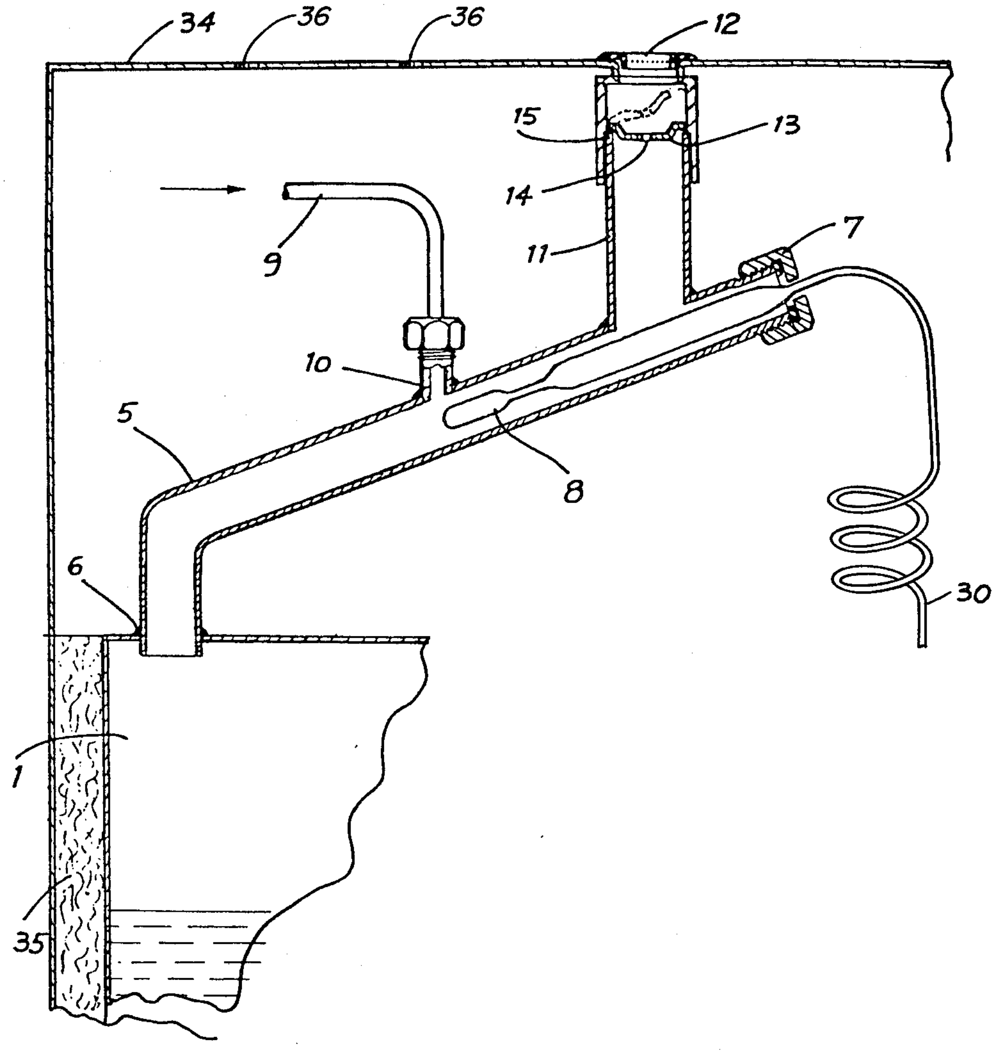
FIG. 2 is a vertical cross-section through the condenser tube of the boiling water heater shown in FIG. 1.

The tank is provided with an inclined condenser tube 5 extending upwardly from a point 6 at or near the top of the tank and preferably from one corner of the tank as shown in FIG. 1.

The tube extends transversely upwardly and across the top of the tank. The tube which may typically comprise 1" copper pipe is provided with an end cap 7 which is threaded to the end of the tube and which is arranged to support a temperature sensing bulb 8. The temperature sensing bulb is preferably a liquid filled thermostat sensing bulb. The inclined condenser tube is connected to a water supply pipe 9 which communicates with the interior of the condenser tube at a water inlet point 10 which is located intermediate of the length of the condenser tube and which is preferably located slightly below the end of the temperature sensing bulb 8. The water supply pipe enters the condenser tube on the upper side of the tube. A vertical flue 11 is provided extending upwardly from and communicating with the interior of the inclined condenser tube at a location above the water inlet point 10. The vertical flue, which may for example comprise 1" diameter pipe, is open to the atmosphere at its upper end 12. To restrict the flow of steam which may issue from the flue a disc valve 13 is provided having a small central aperture 14. The disc valve sits loosely in the flue on a shoulder 15 so that should there be a sudden increase in steam pressure within the heating tank 1 and hence within the inclined condenser tube 5 the disc valve 13 is forced upwardly and tilted by the pressure of the steam to greatly increase the size of the opening and allow for relatively unimpeded egress of the steam.

The cold water supply pipe 9 is connected to a main supply pipe 16 from a cold water supply 17 through a solenoid operated control valve 18. The solenoid 19 of the control valve is connected by way of terminals 20 to the circuitry of the boiling water heater as will be described further later.

The water heater is provided with level control means in the form of a float 21 which is free to float on the surface of the water in the tank guided by a vertical float rod 22. The lower end of the rod is provided with a flange 23 and a clip 24 is secured to the rod adjacent to the upper end of the tank 1. The float rod passes through a guide bush 25 in the upper end of the tank above which is located a disc 26 which is secured to the float rod in an adjustable manner by way of mounting nuts 27. The disc 26 is arranged to operate two microswitches 28 and 29 as the float rod moves downwardly or upwardly respectively.

The level control means is arranged so that when the level of water in the tank drops until the weight of the float 21 is resting on the flange 23, the float rod is moved downwardly moving the disc 26 downwardly and operating the microswitch 28. When the tank is nearly full of water the upper surface of the float 21 abuts the clip 24 moving the float rod and the disc 26 upwardly and operating the microswitch 29.

The output from the temperature control bulb 8 is preferably monitored via the conduit or condenser tube 30 to a theremostat 31 which is variable by way of control knob 32. The water inlet control valve solenoid 19, the microswitches 28 and 29 and the thermostat 31 are electrically interconnected to enable the water heater to operate as described below. It should be noted that the thermostat and temperature sensing bulb can be one integral unit.

The tank of the water heater is provided with an overflow pipe 33 to enable water to be harmlessly drained from the tank should there be some malfunction of the level control system.

The entire unit is mounted within a casing 34 shown in broken outline in FIG. 1. A layer of heat insulating material 35 is provided between the walls of the casing and the walls of the tank.

Figure 3:
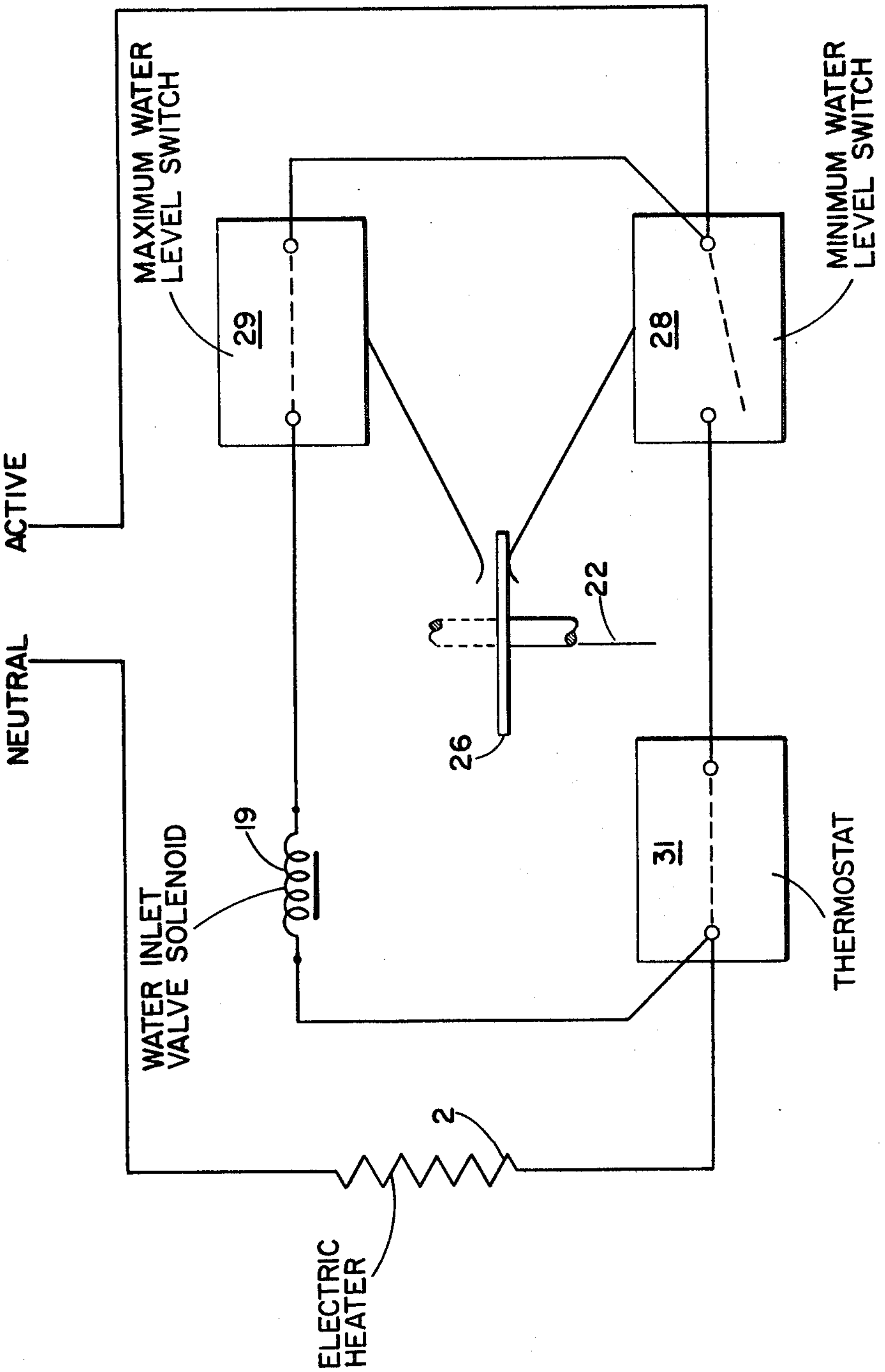
FIG. 3 is an electrical circuit diagram showing the electrical connections of the device of FIG. 1.

FIG. 3 shows the control circuit of the device. Heating element 2, solenoid 19 and microswitch 29 are serially connected. Microswitch 28 and thermostat 31 are serially connected and adapted to shunt solenoid 19 and microswitch 29 from the circuit. Microswitches 28 and 29 are both normally closed, solenoid 19 is of a high impedance (approx 8 W) and thermostat 31 is adapted to open when the temperature sensed by bulb 8 exceeds some adjustable level. In use when the tank is empty, disc 26 opens switch 28 due to the weight of float 21 resting on a flange 23. Thus with microswitch 28 open and microswitch 29 closed, current flows through the serially connected solenoid 19 and element 2. Due to the high impedance (approx 8 W) of solenoid 19 element 2 is rendered ineffective, i.e. no heat is produced, while water inlet valve 18 is opened. Cold water from supply 17 thus enters through inlet pipe 16 to commence filling the tank. Once water covers element 2 by a preselected amount float 21 rises sufficiently and disc 26 is raised by the spring actuating lever of microswitch 28, thus microswitch 28 is closed.

As the water temperature is low thermostat 31 is closed and so the closing of switch 28 causes solenoid 19 to be shunted out of circuit and electricity is supplied directly to element 2 causing it to produce heat. Once the small quantity of water in the tank reaches boiling point, sufficient steam is given off from the surface of the water to pass up the inclined condenser tube 5 and opening thermostat 31 via sensing bulb 8. Solenoid 19 is then brought back into circuit opening water inlet valve 18. As cold water enters inlet pipe 16 the steam in inclined tube 5 is quickly cooled and the temperature at sensing bulb 8 reduced. Thermostat 31 is again closed, solenoid 19 is shunted out of circuit and element 2 is reactivated.

This cycle is continued until the water level rises sufficiently to cause float 21 to force up clip 24 and disc 26 so as to operate switch 29. Thus at the maximum water level switch 29 is opened and solenoid 19 can no longer be activated. Of course at the maximum water level element 2 can still be energized whenever thermostat 31 is closed.

When water is drawn off through outlet 4, or if water is lost through evaporation, float 21 will fall and switch 29 will again be closed. The above described heating-/filling cycle will again commence.

Because cold water is only admitted in small amounts until the temperature of the water in the tank is again elevated to boiling point the body of water within the tank is always maintained at or near boiling point. Once the unit is in operation it is therefore possible for a user to always draw off boiling water from outlet 4. When water is drawn from the heater the level of water in the tank falls causing the microswitch 29 to again be operated by the disc 26 to allow the cold water inlet valve 18 to open and admit more water. The cold water entering the inclined condenser tube 5 just below the temperature sensing bulb 8 causes the temperature in the inclined condenser tube to drop immediately which is sensed by the temperature sensing bulb 8, operating the thermostat 31 and allowing power to be supplied immediately to the heating element 2.

When the tank is full of water held at or near boiling point it is an advantage of the arrangement according to the invention that the condenser tube 5 is surrounded by air at ambient temperature which may be assisted by the provision of vents 36 in the upper part of the casing 34. This allows the temperature in the condenser tube to fall fairly quickly once power has been cut to the heating element 2 so that the temperature bulb 8 may quickly detect this fall in temperature and operate the thermostat 31 to again supply power to the heating element.

In this manner a boiling water heater is provided which enables the virtually continuous supply of boiling hot water to be maintained in a simple yet safe manner and all control components to be contained within the casing.

The claims defining the invention are as follows.

We claim:

1. A boiling water heater comprising a tank adapted to be partially filled with water, a heating element positioned adjacent the bottom of said tank for immersion in the water therein, a hot water outlet located near the bottom of said tank, an inclined condenser tube extending upwardly from the tank and at a point above the maximum water level in the tank and having its lower end communicating with the interior of the tank, a water supply pipe communicating with the interior of said condenser tube at a water inlet point intermediate the length thereof, a control valve in said water supply pipe, water level control means including a float adapted to traverse a vertical rod between a water level lower limit position above said heating element and a water level upper limit position below the tank roof, said control means being actuable by the water level in said tank and arranged to operate said control valve so as to permit energization of the heating element only when the water level is above said lower limit and to maintain the water level in said tank between the upper and lower limits during use, a substantially vertical flue extending upwardly from, and communicating with, the interior of said inclined condenser tube at a location above said water inlet point, and elongated temperature sensing means extending into said inclined condenser tube from the upper end of the condenser tube and having its lower end disposed adjacent said water inlet point and below the entry point of said flue and said temperature sensing means being operable in co-operation with an electrical thermostat to control said heating element and said control valve so that said heating element is rendered ineffective and said valve is operable by said water level control means only in response to the temperature in said condenser tube being above said limit when the water level in the tank is above said lower limit.

2. A boiling water heater as claimed in claim 1 wherein said temperature sensing means comprise a temperature sensing bulb located within said condenser tube and connected to said electrical thermostat.

3. A boiling water heater as claimed in claim 1 wherein said level control means comprise a float assembly including a substantially vertical float rod including first and second stopping devices at the lower and intermediate portions of said rod respectively, a float constrained to move vertically along said float rod in response to said level of the water in said tank between said first and second stopping devices so that the weight of said float is applied to said first stopping device and the buoyancy of said float is applied to said second stopping device when said level of the water is below said lower limit and above said upper limit, respectively, and a control disc adjustably attached to the upper portion of said rod, said control disc arranged to operate a first electrical switch to effectively render inoperative said heating element unless the same is immersed in said water and a second electrical switch to effectively render inoperative the water inlet control valve when the water level in said tank rises above a predetermined level corresponding to said upper limit.

4. A boiling water heater as claimed in claim 3 wherein each said electrical switch is a microswitch.

5. A boiling water heater as claimed in any one of the claims 1 to 4 wherein said control valve in said water supply pipe comprises an electrically operable solenoid valve.

6. A boiling water heater as claimed in any one of the claims 1 to 4 wherein said water inlet point is located in the upper side of said inclined tube.

7. A boiling water heater as claimed in any one of the claims 1 to 4 wherein the upper end of said flue is provided with a disc valve having a central aperture therethrough arranged to allow the restricted egress of steam and wherein said disc valve is loosely mounted on shoulders in said flue so that the disc valve may be tilted by steam pressure within said flue to allow the rapid egress of steam from the upper end of said flue.

8. A boiling water heater as claimed in any one of the claims 1 to 4 wherein said inclined condenser tube is formed from 1" diameter pipe and said vertical flue is formed from 1" diameter pipe.

* * * * *